United States Patent
Santelices et al.

(10) Patent No.: US 6,367,930 B1
(45) Date of Patent: Apr. 9, 2002

(54) PROCESS FOR PREPARING A PHOTOCHROMIC LENS

(75) Inventors: Pia I. Santelices, Portland, OR (US); James N. Rieck, Wheeling, WV (US); Jack C. Chan, Coraopolis, PA (US); Sivaram Krishnan, Pittsburgh, PA (US); William G. Curtis, Sewickley, PA (US); Robert Allen Pyles, Bethel Park, PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/476,251

(22) Filed: Dec. 30, 1999

(51) Int. Cl.$^7$ .................................................. G02C 7/10
(52) U.S. Cl. ........................ 351/177; 351/163; 351/166
(58) Field of Search ................................ 351/162, 163, 351/164, 165, 177, 166

(56) References Cited

U.S. PATENT DOCUMENTS

| | | | |
|---|---|---|---|
| 4,581,288 A | * 4/1986 | Barnhart et al. | 351/163 |
| 4,917,927 A | 4/1990 | Sakaitaini et al. | 428/40 |
| 4,994,208 A | 2/1991 | McBain et al. | 252/586 |
| 5,200,483 A | 4/1993 | Selvig | 526/301 |
| 5,221,721 A | 6/1993 | Selvig | 526/193 |
| 5,244,602 A | 9/1993 | Van Gemert | 252/589 |
| 5,246,630 A | 9/1993 | Selvig | 252/586 |
| 5,264,172 A | 11/1993 | Rosica et al. | 264/132 |
| 5,512,226 A | 4/1996 | Rosica et al. | 264/132 |
| 5,514,317 A | 5/1996 | Rosica et al. | 264/132 |
| 5,531,940 A | 7/1996 | Gupta et al. | 264/1.7 |
| 5,851,328 A | 12/1998 | Kohan | 156/102 |
| 6,180,033 B1 | * 1/2001 | Greshes | 264/1.32 |

FOREIGN PATENT DOCUMENTS

| | | |
|---|---|---|
| EP | 0 894 604 | 2/1999 |
| WO | 96/27496 | 9/1996 |
| WO | 96/34735 | 11/1996 |

* cited by examiner

Primary Examiner—Scott J. Sugarman
(74) Attorney, Agent, or Firm—Joseph C. Gil; Aron Preis; James R. Franks

(57) ABSTRACT

A process for making a photochromic optical lens is disclosed. In a first embodiment of the process a multi-plied laminate, containing a ply of photochromic thermoplastic polyurethane (herein "TPU") and a ply containing thermoplastic polycarbonate, is first placed in the cavity of a suitable mold. The ply that contains polycarbonate resin is placed facing the cavity. Thermoplastic polycarbonate resin is then injected into the cavity. In a second embodiment, referred to as an over-mold method, polycarbonate is first injection molded into a molding cavity to form a substrate. Photochromic TPU is, in a subsequent step, injected into the cavity to form a superstrate overlay. In both embodiments, the articles thus molded are suitable for the preparation of optical lenses.

11 Claims, No Drawings

PROCESS FOR PREPARING A PHOTOCHROMIC LENS

The invention concerns a photochromic lens and more particularly a process for making optical lenses containing thermoplastic polycarbonate and thermoplastic polyurethane resins.

SUMMARY OF THE INVENTION

A process for making a photochromic optical lens is disclosed. In a first embodiment of the process a multi-plied laminate, containing a ply of photochromic thermoplastic polyurethane (herein "TPU") and a ply containing thermoplastic polycarbonate, is first placed in the cavity of a suitable mold. The ply that contains polycarbonate resin is placed facing the cavity. Thermoplastic polycarbonate resin is then injected into the cavity. In a second embodiment, referred to as an over-mold method, polycarbonate is first injection molded into a molding cavity to form a substrate. Photochromic TPU is, in a subsequent step, injected into the cavity to form a superstrate overlay. In both embodiments, the articles thus molded are suitable for the preparation of optical lenses.

BACKGROUND OF THE INVENTION

Processes for co-injection and multi-shot injection molding are also well known. Essentially, these refer to processes where a plurality of resins, through a continuous controlled injection, are molded to form a part. Examples include forming a core material, which is then encapsulated by a higher quality skin. These multi-layered "sandwich moldings" allow the use of less expensive or specialized resin for the core, with only a thin skin of material meeting more rigid requirements for aesthetics and durability. Also included is the "two-color" or "multi-shot" process where the material components are "over-molded" selectively onto other segments of a single molding in discrete steps. These processes have been used in the preparation of blow-molded packaging, using multi-cavity tooling and multi-layered structures to achieve barrier-properties in the part.

A process variation known as "mono-sandwich" molding is one where the core material is transported along the barrel of a standard injection system, while the skin material feeds into the end of the main barrel from a side extruder. With the two screws properly sequenced, the skin and core materials are "layered" within the barrel, and then injected with a single stroke.

The processes have been used in applications such as ones requiring placing a soft, tactile material on a stiff base, and in applications where molding of different colors as one component, as with red, clear, and amber segments in automotive tail lamp lenses. Chemically compatible plastics bond to each other best, and over-molding may also connect segments of incompatible plastics using undercuts and mechanical interlocks.

The in-mold decoration method is yet another well known variation of the co-injection molding technique. In this process, decorative artwork may be molded into the part. In the process, a decorated film is placed into a mold, and the injection molding process encapsulates the ink between the film and the later-injected molding resin.

Relevant information respecting mold design, injection molding machine and a method for forming a multi-layer plastic article by over molding has been disclosed in European Patent Application 894604. Further relevant information respecting insert-molding may be found in U.S. Pat. Nos. 5,264,172, 5,512,226, 5,514,317 and 4,917,927, the disclosures of all is incorporated herein by reference.

Articles which have organic photochromic dye(s) applied to or incorporated therein are characterized in that upon exposure to electromagnetic radiation or to solar light they exhibit a reversible change in color and in light transmission. Once the exposure to the original radiation has been discontinued, the composition returns to its original color, or colorless state. Recently, photochromic plastic materials, most notably, such compositions which may be suitable for the preparation of ophthalmic lenses, films and automotive head lamp lenses have been the focus of attention in the relevant arts. It is known that photochromic behavior may be imparted to glass and to certain plastic materials by using inorganic and organic dyes respectively. Photochromic articles prepared from synthetic organic resins such as homopolymers of a poly(allyl carbonate) monomer are known (U.S. Pat. Nos. 4,994,208, 5,246,630, 5,221,721 and 5,200,483.)

U.S. Pat. No. 5,244,602 describes a naphthopyran useful for photochromic polymers and also organic hosts such as polyurethanes for such materials. McBain, et al. (U.S. Pat. No. 4,994,208) demonstrated that the photochromic performance of matrices prepared by the free radical polymerization of polyol(allyl carbonates), e.g., diethylene glycol bis (allyl carbonate), could be improved by the incorporation of 10 to 40 weight percent of an aliphatic polyurethane having terminal ethylenic unsaturation. Selvig (U.S. Pat. No. 5,200,483), showed an improvement over McBain. et al.

DETAILED DESCRIPTION OF THE INVENTION

The lens prepared by the inventive process contains a polycarbonate substrate and a photochromic superstrate. Lenses prepared by the insert-molding method contain a superstrate which is formed from a multi-plied laminate containing a ply of photochromic TPU and a polycarbonate ply. The superstrate of the lens prepared by the over-mold method contains photochromic TPU. In terms of relative sizes, the substrate is about 2.0 to 12.5 millimeters (mm), preferably 2 to 8 mm, more preferably 2 to 5 mm in thickness and the superstrate has a thickness of 0.1 to 1.25 mm, preferably 0.2 to 0.5 mm. In the superstrate prepared in accordance with the insert-molding embodiment of the invention, the thickness of the polycarbonate ply is about 0.1 to 0.5 mm, preferably 0.127 to 0.381 mm, and the thickness of the ply containing photochromic TPU is about 0.1 to 1.25 mm, preferably 0.127 to 0.254 mm.

Suitable polycarbonate resins for preparing the substrate of the inventive lens are transparent homopolycarbonates and copolycarbonates and mixtures thereof. Transparency, a requirement of the lens of the present invention, means that the polycarbonate (substrate) has a total light transmission of at least 89% and a haze value of less than 1% as determined on a substrate having a thickness of 0.1 inch (2.54 mm).

The polycarbonates generally have a weight average molecular weight of 10,000 to 200,000, preferably 15,000 to 80,000 and their melt flow rate, per ASTM D-1238 at 300° C., is about 1 to about 85 g/10 min., preferably about 2 to 24 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph by H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the invention conform to the structural formulae (1) or (2).

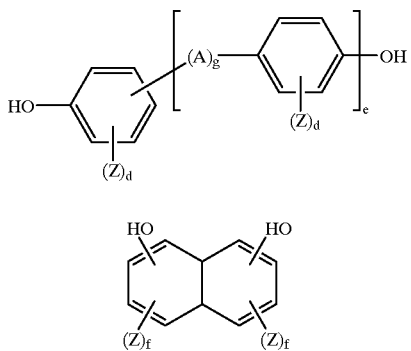

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$ or a radical conforming to

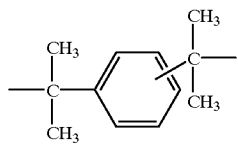

e and g both denote the number 0 to 1;
Z denotes F, Cl, Br or $C_1$–$C_4$-alkyl and if several Z radicals are substituents in one aryl radical, they may be identical or different from one another;
d denotes an integer from 0 to 4; and
f denotes an integer from 0 to 3.

Among th e dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, dihydroxydiphenyl cycloalkanes, and α,α-bis-(hydroxyphenyl)-diisopropyl-benzenes, as well as their nuclear-alkylated compounds. These and further suitable aromatic dihydroxy compounds are described, for example, in U.S. Pat. Nos. 5,227,458, 5,105,004; 5,126,428; 5,109,076; 5,104,723; 5,086,157; 3,028,356; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxybenzophenone, 2,4-bis-(3,5-dimethyl-4-hydroxyphenyl)-cyclohexane, α,α'-bis-(3,5-dimethyl-4-hydroxyphenyl)-p-diisopropyl-benzene and 4,4'-sulfonyl diphenol.

Examples of particularly preferred aromatic bisphenols are 2,2-bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxyphenyl)-3,3,5-trimethylcyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention is phenol-phthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05 to 2.0 mol % (relative to the bisphenols) of polyhydroxy compounds. Polycarbonates of this type have been described, for example, in German Offenlegungsschriften 1,570,533; 2,116,974 and 2,113,374; British Patents 885,442 and 1,079, 821 and U.S. Pat. No. 3,544,514. The following are some examples of polyhydroxy compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methylphenol; 2,4-dihydroxybenzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxy-benzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by reference, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5 to 24, 13 to 16, 7.5 to 13.0 and 3.5 to 6.5 g/10 min., respectively. These are products of Bayer Corporation of Pittsburgh, Pa.

A polycarbonate resin suitable in the practice of the invention is known and its structure and methods of preparation have been disclosed, for example, in U.S. Pat. Nos. 3,030,331; 3,169,121; 3,395,119; 3,729,447; 4,255,556; 4,260,731; 4,369,303 and 4,714,746 all of which are incorporated by reference herein.

The thermoplastic polyurethane suitable in the practice of the invention is both transparent and photochromic. It comprises a thermoplastic polyurethane (herein "TPU") and a photochromic compound. TPU is a well known resin which is readily available in commerce, such as under the Texin trademark, from Bayer Corporation. Typically, the preparation of TPU entails reacting (a) an isocyanate-reactive mixture which contains (i) from about 40 to about 85% preferably 50 to 70% by weight of one or more polyols having a nominal functionality of about 2 and (number average) molecular weights of from 500 to 6000, preferably 1000 to 3,000 g/mole (ii) from about 15 to about 60%, preferably 30 to 50%, by weight of one or more diols having a functionality of about 2 and molecular weights of from 62 to 499 with (b) a polyisocyanate, preferably aliphatic polyisocyanate, having a functionality of about 2. The resulting TPU resin is admixed with a photochromic compound selected from a group consisting of spirooxazines, fulgides, fulgimides, and naphthopyrans, wherein the photochromic compound is present in an amount of 0.01 to 5 parts per hundred parts by weight of the resin. The introduction of the photochromic compound in the resin may also be carried out concurrently with the preparation of the TPU.

TPUs may be produced in stages (prepolymer method) or by the simultaneous reaction of all the components in one step (one shot). In the former, a prepolymer from the polyol and diisocyanate is first formed and then reacted with the chain extender. TPUs may be produced continuously or batch-wise. The preferred methods are the well know belt process and the extruder process.

Examples of the suitable polyols include difunctional polyether polyols, polyester polyols, and polycarbonate polyols. Small amounts of trifunctional polyols may be used, yet care must be taken to make certain that the thermoplasticity of the TPU remains substantially un-effected.

Suitable polyester polyols include the ones which are prepared by polymerizing ε-caprolactone using an initiator such as ethylene glycol, ethanolamine and the like. Further suitable examples are those prepared by esterification of polycarboxylic acids. The polycarboxylic acids may be aliphatic, cycloaliphatic, aromatic and/or heterocyclic and they may be substituted, e.g., by halogen atoms, and/or unsaturated. The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include, e.g., ethylene glycol; propylene glycol-(1,2) and -(1,3); butylene glycol-(1,4) and -(1,3); hexanediol-(1,6); octanediol-(1,8); neopentyl glycol; (1,4-bis-hydroxy-methylcyclohexane); 2-methyl-1,3-propanediol; 2,2,4-tri-methyl-1,3-pentanediol; triethylene glycol; tetraethylene glycol; polyethylene glycol; dipropylene glycol; polypropylene glycol; dibutylene glycol and polybutylene glycol, glycerine and trimethlyolpropane. A preferred polyester polyol is butylene adipate.

In accordance with the present invention, the polyisocyanate component, preferably aliphatic polyisocyanate, has a viscosity of less than about 20,000 mPa·s at 25° C. and an average NCO functionality of about 2, most preferably 2. It may also be in the form of an NCO prepolymer or a polyisocyanate adduct, more preferably a polyurethane prepolymer. Suitable polyisocyanate components for the present invention may be based, for example, on organic aliphatic diisocyanates including, for example, 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)-methane, 2,4'-dicyclohexylmethane diisocyanate, 1,3- and 1,4-bis-(isocyanatomethyl)-cyclohexane, bis-(4-isocyanato-3-methylcyclohexyl)-methane, α,α,α',α'-tetramethyl-1,3- and/or -1,4-xylylene diisocyanate, 1-isocyanato-1-methyl-4 (3)-isocyanatomethyl cyclohexane, 2,4- and/or 2,6-hexahydrotoluylene diisocyanate, and mixtures thereof. It is preferred that the isocyanate be based on mixtures of the various stereoisomers of bis-(4-isocyanatocyclohexl)-methane.

While small amounts of the diisocyanates may be replaced by polyisocyanate; care must be taken to avoid the formation of excessive crosslinking and deterioration of the thermoplasticity in the resulting product. Examples of such optional polyisocyanates include triphenylmethane 4,4',4"-triisocyanate and polyphenyl-polymethylene polyisocyanates.

Preferred chain extenders with molecular weights of 62 to 500 include aliphatic diols containing 2 to 14 carbon atoms, such as ethanediol, 1,6-hexanediol, diethylene glycol, dipropylene glycol, and 1,4-butanediol in particular, for example. However, diesters of terephthalic acid with glycols containing 2 to 4 carbon atoms are also suitable, such as terephthalic acid-bis-ethylene glycol or -1,4-butanediol for example, or hydroxyalkyl ethers of hydroquinone, such as 1,4-di-(β-hydroxyethyl)-hydroquinone for example, or (cyclo) aliphatic diamines, such as isophorone diamine, 1,2- and 1,3-propylenediamine, N-methyl-propylenediamine-1,3 or N,N'-dimethyl-ethylenediamine, for example, and aromatic diamines, such as toluene 2,4- and 2,6-diamines, 3,5-diethyltoluene 2,4- and/or 2,6-diamine, and primary ortho-, di-, tri- and/or tetraalkyl-substituted 4,4'-diaminodiphenylmethanes, for example. Mixtures of the aforementioned chain extenders may also be used. Optionally, triol chain extenders having a molecular weight of 62 to 500 may also be used. Moreover, customary monofunctional compounds may also be used in small amounts, e.g., as chain terminators or demolding agents. Alcohols such as octanol and stearyl alcohol or amines such as butylamine and stearylamine may be cited as examples.

In order to prepare the TPUs, the synthesis components may be reacted, optionally in the presence of catalysts, auxiliary agents and/or additives, in amounts such that the equivalent ratio of NCO groups to the sum of the groups which react with NCO, particularly the OH groups of the low molecular weight diols/triols and polyols, is 0.9:1.0 to 1.2:1.0, preferably 0.95:1.0 to 1.10:1.0.

Suitable catalysts include tertiary amines which are known in the art, such as triethylamine, dimethyl-cyclohexylamine, N-methylmorpholine, N,N'-dimethyl-piperazine, 2-(dimethyl-aminoethoxy)-ethanol, diazabicyclo-(2,2,2)-octane and the like, for example, as well as organic metal compounds in particular, such as titanic acid esters, iron compounds, tin compounds, e.g., tin diacetate, tin dioctoate, tin dilaurate or the dialkyltin salts of aliphatic carboxylic acids such as dibutyltin diacetate, dibutyltin dilaurate or the like. The preferred catalysts are organic metal compounds, particularly titanic acid esters and iron and/or tin compounds.

The dyes suitable in the context of the invention are photochromic compounds selected from the group consisting of benzopyrans, naphthopyrans, spirobenzopyrans, spironaphthopyrans, spirobenzoxazines, spironaphthoxazines, fulgides and fulgimides. Such photochromic compounds have been reported in the literature including U.S. Pat. Nos. 4,826,977; 4,931,221; 5,106,998; 5,552,090; 5,628,935 and 5,565,147 (all incorporated herein by reference).

The color range of the naphthopyrans suitable in the present invention is 410 to 500 nm, thus they impart a yellow or orange coloration in their darkened state. In the faded, or bleached condition, the materials exhibit a colorless or pale yellow coloration. The present invention may be used in a mixture or combined with suitable organic photochromic compounds, to obtain, after activation, the formation of neutral coloring such as green, brown and gray. Particularly useful for the purpose are photochromic compounds belonging to the group of naphthopyrans, spiro-indolino-oxazines and spiro-indolino pyrans which are known and are available in commerce. These have a high quantum efficiency for coloring, a good sensitivity and saturated optical density, and an acceptable bleach or fade rate. These compounds may be represented by the following graphic formulae IA1, IA2, and IA3 in which the letters a through n represent the sides of the naphthopyran rings, and the numbers represent the numbering of the ring atoms of the naphthopyrans:

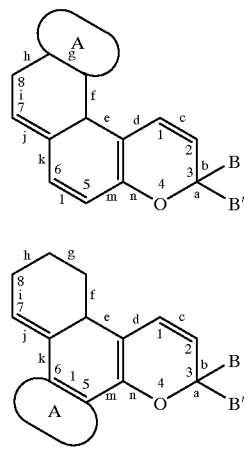

1A1

1A2

1A3

In graphic formulae IA1, IA2, and IA3, the group represented by A is a substituted or un-substituted, five or six member heterocyclic ring fused to the g, i, or l side of the naphthopyran and is represented by the following graphic formulae IIA through IIF:

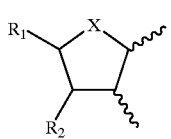

IIA

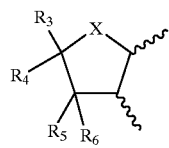

IIB

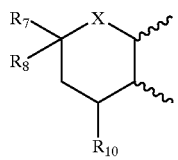

IIC

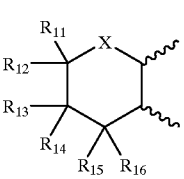

IID

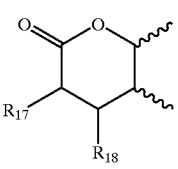

IIE

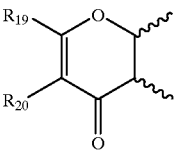

IIF

In graphic formulae IIA through IID, X may be an oxygen or a nitrogen atom, the nitrogen atom being substituted with hydrogen or a $C_1$–$C_4$ alkyl. $R_1$ may be hydrogen, $C_1$–$C_6$ alkyl, substituted or unsubstituted phenyl, carboxy, or $C_1$–$C_6$ alkoxycarbonyl. Preferably, $R_1$ is hydrogen, $C_1$–$C_3$ alkyl, substituted or unsubstituted phenyl, carboxy, or $C_1$–$C_3$ alkoxycarbonyl. $R_2$ may be hydrogen, $C_1$–$C_6$ alkyl, or substituted or unsubstituted phenyl. Preferably, $R_2$ is hydrogen, $C_1$–$C_3$ alkyl, or substituted or unsubstituted phenyl. $R_3$ and $R_4$ may each be hydrogen, $C_1$–$C_6$ alkyl or phenyl. Preferably, $R_3$ and $R_4$ are each hydrogen, $C_1$–$C_3$ alkyl, or phenyl. $R_5$ and $R_6$ may each be hydrogen, $C_1$–$C_6$ alkyl, phenyl, hydroxy, $C_1$–$C_6$ alkoxy, or acetoxy. Preferably, $R_5$ and $R_6$ are each hydrogen, $C_1$–$C_3$ alkyl, phenyl, hydroxy, $C_1$–$C_3$ alkoxy, or acetoxy. $R_7$, $R_8$, and $R_{10}$ may each be hydrogen, $C_1$–$C_6$ alkyl, or phenyl, provided that when $R_7$ is phenyl, $R_8$ is hydrogen or $C_1$–$C_6$ alkyl and when $R_8$ is phenyl $R_7$ is hydrogen or $C_1$–$C_6$ alkyl. Preferably, $R_7$, $R_8$, and $R_{10}$ are each hydrogen, $C_1$–$C_3$ alkyl, or phenyl. Most preferably, $R_1$, $R_2$ $R_3$, $R_4$, $R_5$, $R_6$, $R_7$, $R_8$, and $R_{10}$ are each hydrogen or methyl. $R_{11}$, $R_{12}$, $R_{13}$, $R_{14}$, $R_{15}$, and $R_{16}$ may each be hydrogen, $C_1$–$C_6$ alkyl, $C_1$–$C_6$ alkoxy, or phenyl, Preferably, $R_{11}$, $R_{12}$, $R_{13}$, $R_{14}$, $R_{15}$, and $R_{16}$ are each hydrogen, $C_1$–$C_3$ alkyl, $C_1$–$C_3$ alkoxy, or phenyl. Most preferably, $R_{11}$, $R_{12}$, $R_{13}$, $R_{14}$, $R_{,15}$, and $R_{16}$ are each hydrogen, methyl, or methoxy.

In graphic formulae IIE and IIF, $R_{17}$ may be hydrogen, $C_1$–$C_6$ alkyl, substituted or unsubstituted phenyl, or halogen. Preferably, $R_{17}$ is hydrogen, $C_1$–$C_3$ alkyl, substituted or unsubstituted phenyl, or halogen. Most preferably, $R_{17}$ is hydrogen, methyl, or chloro. $R_{18}$ may be hydrogen, $C_1$–$C_6$ alkyl, phenyl, carboxy, $C_1$–$C_6$ alkoxy-carbonyl, or $C_1$–$C_6$ haloalkoxycarbonyl. Preferably, $R_{18}$ is hydrogen, $C_1$–$C_3$ alkyl, phenyl, carboxy, $C_1$–$C_3$ alkoxycarbonyl, or $C_1$–$C_3$ haloalkoxycarbonyl. $R_{19}$ and $R_{20}$ may each be hydrogen, $C_1$–$C_6$ alkyl, or phenyl. Preferably, $R_{19}$ and $R_{20}$ are each hydrogen, $C_1$–$C_3$ alkyl, or phenyl. Most preferably, $R_{18}$, $R_{19}$, and $R_{20}$ are each hydrogen or methyl. $R_1$–$R_{20}$ the phenyl substituents may be $C_1$–$C_3$ alkyl and the halogen or (halo) groups may be chloro or bromo.

In graphic formulae IA1, IA2, and IA3, B and B' may each be selected from the group consisting of (i) the substituted or unsubstituted aryl groups phenyl and naphthyl; (ii) the substituted or unsubstituted heterocyclic aromatic groups pyridyl, furyl, benzofuryl, thienyl, and benzothienyl; and (iii) B and B' taken together form the adamantyl group. The aryl and heterocyclic substituents of B and B' may each be selected from the group consisting of hydroxy, $C_1$–$C_3$ alkyl, $C_1$–$C_5$ haloalkyl, which includes mono-, di-, and trihalo substituents, $C_1$–$C_5$ alkoxy, $C_1$–$C_5$ alkoxy($C_1$–$C_4$) alkyl, $C_1$–$C_5$ dialkylamino, acryloxy, methacryloxy, and halogen, said halogen or (halo) groups being fluoro, chloro, or bromo.

Preferably, B and B' are represented respectively by the following graphic formulae:

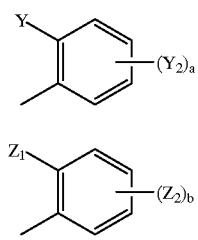

IIIA

IIIB

In graphic formulae IIIA and IIIB, $Y_1$ and $Z_1$ may each be selected from the group consisting of hydrogen, $C_1$–$C_5$ alkyl, $C_1$–$C_5$ alkoxy, fluoro, and chloro; $Y_2$ and $Z_2$ are each selected from the group consisting of $C_1$–$C_5$ alkyl, $C_1$–$C_5$ alkoxy, hydroxy, halogen, e.g., chloro, fluoro, and bromo, acryloxy, and methacryloxy, and a and b are each integers from 0 to 2. Most preferably, $Y_1$ and $Z_1$ are each hydrogen, $C_1$–$C_3$ alkyl, $C_1$–$C_3$ alkoxy, or fluoro, $Y_2$ and $Z_2$ are each $C_1$–$C_3$ alkyl or $C_1$–$C_3$ alkoxy, a is the integer 0 or 1, and b is an integer from 0 to 2.

The preferred naphthopyrans of the present invention are represented in the following graphic formula IB. In graphic formula IB, the A group represents formulae IIA through IID with X being an oxygen atom, formulae IIE and IIF. The A group is fused so that the oxygen atom of formulae IIA through IIF is attached to the number 8 carbon atom of the naphtho portion of the naphthopyran.

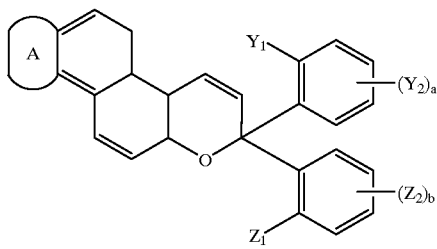

IB

A still preferred dye may be described as naphthopyrans substituted at the 3 position of the pyran ring with (i) an aryl substituent and (ii) a phenyl substituent having a 5- or 6-member oxygen and/or nitrogen containing heterocyclic ring fused at the number 3 and 4 carbon atoms of the phenyl substituent and with a nitrogen-containing heterocyclic ring at the 6 position of the naphthyl portion of the naphthopyran compound. These compounds may be represented by the following graphic formula:

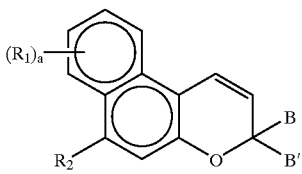

I

In graphic formula I, $R_1$ may be $C_1$–$C_{10}$ alkyl, halogen, or the group, —O—L, wherein L is a $C_1$–$C_{12}$ alkyl, e.g., methyl, ethyl, propyl, butyl, pentyl, hexyl, heptyl, octyl, nonyl, decyl, undecyl, and dodecyl, said halogen being chloro, fluoro, or bromo, and a is the integer 0, 1 or 2. Preferably, $R_1$ is $C_1$–$C_5$ alkyl, fluoro, bromo or the group, —O—L, wherein L is $C_1$–$C_4$ alkyl and a is the integer 0 or 1. Most preferably, $R_1$ is $C_1$–$C_3$ alkyl, fluorine or the group —O—L, wherein L is methyl, and a is the integer 0 or 1.

In graphic formula I, $R_2$ may be a saturated, unsubstituted or mono- or di-substituted nitrogen containing heterocyclic group selected from the following groups represented by graphic formulae IA through IG:

IA

IB

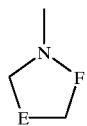

IC

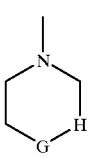

ID

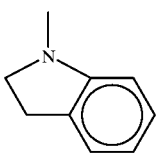

IE

IF

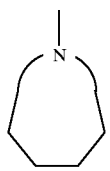

IG

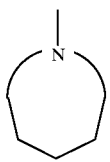

wherein E and F in graphic formula IC, are each a nitrogen or carbon atom, provided that when E is nitrogen, F is a carbon atom, and G in graphic formula ID, is a nitrogen, oxygen, or carbon atom and H is a nitrogen or carbon atom, provided that when H is nitrogen, G is a carbon atom. Examples of $R_2$ groups include aziridino, azetidino, 1-pyrrolidyl, 1-pyrrolinyl, 1-imidazolidyl, 2-imidazolin-1-yl, 2-pyrazolidyl, 3-pyrazolin-2-yl, morpholino, piperidino, piperazinyl, 4-methyl-1-piperazinyl, 1,4,5,6,-tetrahydropyrimidinyl, 1-indolinyl, hexamethyleneimino, and heptamethyleneimino. The substituents for $R_2$ can be $C_1$–$C_6$ alkyl and/or $C_1$–$C_6$ alkoxy. Preferably, $R_2$ is an unsubstituted or mono-substituted member of the group consisting of indolinyl, morpholino, and piperidino. More preferably, $R_2$ is morpholino.

B may be the substituted or unsubstituted aryl group, naphthyl or phenyl, said aryl substituents being $C_1$–$C_5$ alkyl, halo($C_1$–$C_5$)alkyl, hydroxy, $C_1$–$C_5$ alkoxy, $C_1$–$C_4$ alkoxy ($C_1$–$C_4$)alkyl, halogen, morpholino, piperidino, or R(R") N—, wherein R and R" are each hydrogen or $C_1$–$C_3$ alkyl, said halogen (or halo) groups being fluoro or chloro. Preferably, B is represented by the following graphic formula II:

II

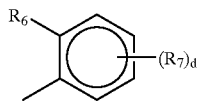

In graphic formula II, $R_6$ is hydrogen, $C_1$–$C_4$ alkyl, $C_1$–$C_4$ alkoxy, fluoro, or chloro and each $R_7$ is a $C_1$–$C_4$ alkyl, $C_1$–$C_4$ alkoxy, hydroxy, chloro, or fluoro and d is an integer from 0 to 2. Preferably, $R_6$ is hydrogen and $R_7$ is selected from the group consisting of fluoro, methyl and methoxy.

B' may be represented by one of the following graphic formulae III or IV:

III

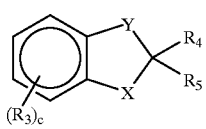

IV

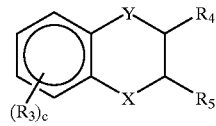

In graphic formula III and IV, X is oxygen or nitrogen and Y is carbon or oxygen, provided that when X is nitrogen, Y is carbon; $R_4$ and $R_5$ are each hydrogen or $C_1$–$C_5$ alkyl; each $R_3$ is a $C_1$–$C_5$ alkyl, $C_1$–$C_5$ alkoxy, hydroxy, or halogen, said halogen substituent being chloro, fluoro, or bromo, and c is an integer from 0 to 3, e.g., 0, 1, 2, or 3. Preferably, B' is represented by graphic formula III or IV, wherein X is oxygen; Y is carbon or oxygen; $R_4$ and $R_5$ are each hydrogen or $C_1$–$C_4$ alkyl; each $R_3$ is a $C_1$–$C_4$ alkyl, $C_1$–$C_4$ alkoxy, hydroxy, or fluoro; and c is the integer 0, 1 or 2. Most preferably, B' is 2,3-dihydroxybenzofuran-5-yl, 2-methyldihy-droxybenzofuran-5-yl, indoline-5-yl, 1,2,3,4-tetrahydroquinoline-6-yl, chroman-6-yl or 1,3-benzodioxole-5-yl.

In graphic formula III, when $R_4$ and $R_5$ are H and when X is oxygen and Y is carbon and c is zero, the group is a 2,3-dihydrobenzo-furan-5-yl; when X is oxygen and Y is oxygen and c is zero, the group is 1,3-benzodioxole-5-yl; and when X is nitrogen and Y is carbon and c is zero, the group is indoline-5-yl. In graphic formula IV, when X is oxygen and Y is carbon, the unsubstituted group is a chroman-6-yl; when X is oxygen and Y is oxygen, the unsubstituted group is a 1,4-benzodioxan-6-yl; and when X is nitrogen and Y is carbon, the unsubstituted group is 1,2,3,4-tetrahydroquinoline-6-yl. For brevity, these groups will be referred to herein as fused heterocyclicphenyl groups.

The preferred naphthopyran dye is 3,3-diphenyl-3-H-naphtho[2,1-b]pyran represented by the formula

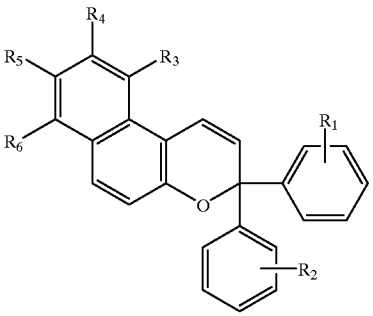

where $R_1$ to $R_6$ denote hydrogen.

The spiroxazines suitable in the present invention are known: see for instance, U.S. Pat. Nos. 3,562,172; 3,578,602; 4,215,010 and 4,342,668, all of which are incorporated by reference herein. Essentially, the spirooxazines suitable in the present invention may be described by the formula

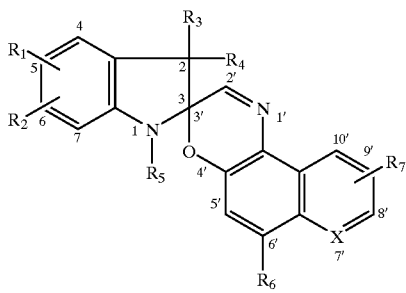

(I)

where:

R₁ and R₂ independently represent a hydrogen or halogen (fluorine, chlorine or bromine) atom or a group chosen from $C_1$–$C_5$ linear or branched alkyl, $C_1$–$C_5$ perfluoroalkyl, $C_1$–$C_5$ alkoxy, nitro or cyano;

R₃ and R₄ independently represent $C_1$–$C_5$ linear or branched alkyl, phenyl or benzyl groups; or R₃ and R₄ when considered jointly with the carbon atom to which they are linked form a $C_5$–$C_8$ cycloalkyl group;

R₅ represents a $C_1$–$C_5$ linear or branched alkyl, phenyl, benzyl or allyl group;

R₆ represents a hydrogen atom or a $C_1$–$C_5$ linear or branched alkyl group or the group —NR₈R₉ where R₈ is a $C_1$–$C_5$ linear or branched alkyl, phenyl or benzyl group, R₉ is hydrogen or has the same meaning as R₈, or R₈ and R₉ when considered jointly with the nitrogen atom to which they are linked form a cyclic structure comprising 5–12 members and possibly containing a further heteroatom chosen from oxygen and nitrogen; and R₇ represents a hydrogen or halogen (fluorine, chlorine or bromine) atom or a group chosen from: $C_1$–$C_5$ linear or branched alkyl, $C_1$–$C_5$ alkoxy, cyano, thio-ether and carboxylated ester with 1–3 carbon atoms in the ester portion, or represents an aromatic or heterocyclic condensed ring;

X represents CH or N—.

In particular, the groups R₁ and R₂, when not hydrogen, can be linked in any of positions 4, 5, 6 and 7 of the indoline part of the molecule. In addition, the group R₇, if not representing hydrogen or an aromatic or heterocyclic condensed ring, can be present in any of the positions 7', 8', 9' and 10' of the naphthalene part of the molecule.

In the preferred embodiment, photochromatic compounds corresponding to general formula (I) are used in which:

R₁ and R₂ independently represent a hydrogen atom or the methyl group;

R₃ and R₄ each represent the methyl group or jointly represent the cyclohexyl group;

R₅ represents the methyl group;

R₆ represents a hydrogen atom or the —NR₈R₉ group where the groups R₈ and R₉ together with the nitrogen atom to which they are linked form a piperidyl, morpholyl, pyrrolidyl or hexamethyleneimino ring structure; and R₇ represents a hydrogen atom; and X represents CH.

Examples of preferred photochromatic compounds used according to the present invention are 1,3,3,4,5- or 1,3,3,5, 6-pentamethyl spiro(indoline-2,3'-[3H]-naphtho-(2,1-b)-(1, 4)-oxazine); 1,3,3-trimethyl spiro(indoline-2,3'-[3H]-naphtho-2,1-b)-(1,4)-oxazine); 1,3,3-trimethyl spiro (indoline-6-(1-piperidyl)-2,3'-[3H]-naphtho-2,1-b)-(1,4)-oxazine; 1,3,3-trimethyl spiro(indoline-6'-(1-morpholyl)-2, 3'-[3H]-naphtho-(2,1-b)-(1,4)-oxazine); 1,3,3,4,5- or 1,3,3, 5,6-pentamethyl spiro(indoline-6'-(1-piperidyl)-2,3'-[3H]-naphtho-(2,1-b)-(1,4)-oxazine); and 1,3,3-trimethyl spiro (indoline-6'-(1-piperidyl)-9'-(methoxy)-2,3'-[3H]-naphtho-(2,1-b)-(1,4)-oxazine).

The spiropyrans useful for the purposes of the present invention, are photochromatic organic compounds which can be defined by the following general formulae (II), (III), (IV) and (V):

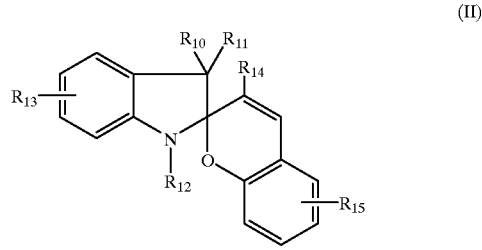

indoline naphtho pyrans (II)

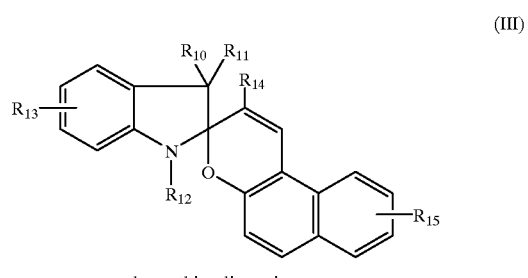

benzothiazoline spiro pyrans (III)

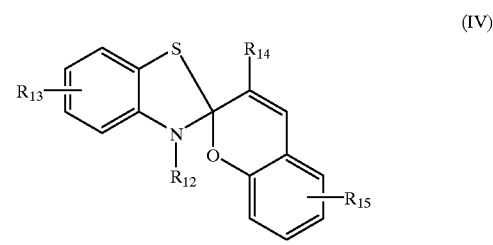

benzoxazoline spiro pyrans (IV)

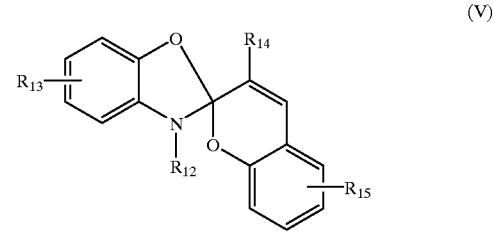

(V)

In the preceding general formulae:

R₁₀ and R₁₁ represent alkyl or aryl groups;

R₁₂ represents an alkyl, aryl group or alkyl substituted group (such as, hydroxyalkyl, halogenalkyl, carbalcoxyalkyl, alkoxyalkyl and aminoalkyl);

R₁₄ represents hydrogen or an alkyl, aryl or alkoxy; and

R₁₃ and R₁₅ represent hydrogen or mono- or polysubstitution groups, chosen among alkyl and substituted alkyl groups, or halogen, nitro or alkoxy.

Fulgides and fulgimides suitable in the context of the invention are known and have been described in the literature (see, for instance, Applied Photochromic Polymer Systems, Edited by C. B. McArdle, Blackie USA: Chapman & Hall, New York, 1992, pp. 80–120) incorporated by reference herein.

The preparation of a thermoplastic composition containing photochromic dye (herein "Photochromic TPU") is conventional. The preparation of a laminate containing a ply of polycarbonate and a ply of Photochromic TPU is conventional. Suitable laminates may also be available in commerce, such as from Bayer Corporation.

Auxiliary agents and/or additives may be incorporated in the TPU, including internal lubricants, anti-seizing agents, inhibitors, stabilizers against hydrolysis, light, heat and discoloration, colorants and pigments, provided that the addition would not adversely effect the transparency of the composition.

In the one embodiment of the invention, namely the insert molding method, a laminate of polycarbonate and Photochromic TPU may first be pre-formed by any of conventional means including thermoforming and high pressure forming and may then be trimmed to fit the cavity of a lens-mold. Trimming may be carried out by die cutting, laser cutting or any of the well known hard tooling methods. The thus preformed and trimmed laminate is then placed in the mold cavity with the polycarbonate ply facing the cavity and the Photochromic TPU ply facing the wall of the mold and thermoplastic polycarbonate resin is injected directly to the thus positioned laminate.

In a second embodiment of the invention, namely overmolding, a polycarbonate lens is first prepared by injection molding followed by injection of Photochromic TPU directly onto the already molded polycarbonate lens. Naturally, this method may be carried out by two separate injection molding machines, wherein one machine molds the polycarbonate lens and the other machine injects the Photochromic TPU over the polycarbonate. A yet additional, more preferred embodiment entails a two-shot injection molding machine wherein a first one of two barrels, both injecting into the same cavity, injects the polycarbonate to form a substrate. The mold is then rotated to line up with the runner system of the barrel injecting the Photochromic TPU and this material is then injected to the still hot polycarbonate substrate. In the preferred embodiment the resulting lens features better optical characteristics.

The invention is further illustrated but is not intended to be limited by the following examples in which all parts and percentages are by weight unless otherwise specified.

EXAMPLES

Experimental

Lenses were produced in accordance with the invention in a two-shot injection molding method. Accordingly to a polycarbonate substrate having a thickness of about 100 mils, a superstrate (26 mils in thickness) of TPU containing photochromic dye was applied by injection. The superstrate contained aliphatic TPU (Bayer Corporation Texin DP7-3018 aliphatic, polyester based thermoplastic polyurethane) and 1.7% dye. The dye was actually a combination of photochromic dyes incorporated in the resin in the following amounts (the amounts provided are in grams of dye per 1 pound of thermoplastic polyurethane):

7.5 gm/1 lbs. TPU of Variacol Blue A (=1,3 dihydro-1,1,3 trimethylspiro -2H-indole-2,3'-(3H)-naphtho(2,1 -b)-(1,4)-oxazine); 0.149 gm/1 lbs. TPU of Variacol Red PNO (=Spiro(2H-Indole-2,3'(3H) Naphtho-(2,1-b)-(1, 4)-oxazine)-1,3-dihydro-1,3,3-trimethyl-6'-(1-piperidinyl); and 0.006 gm/1 lbs. TPU of Variacol Yellow L (=3,3-diphenyl-3H-naphtho-2,1-b)-pyran. These dyes are products of Great lakes Chemical (Europe).

For measuring the darkening rate, the samples were exposed to UV radiation (Spectrolin long wavelength—365 nm—lamp) for ten minutes. The absorbancy at the peak maximum of the dye (424 nm for Variacrol Yellow L; 610 nm for Variacrol Blue A; and 586 nm for Variacrol Red PNO) was recorded at four second intervals of a ten minute period using a spectrophotometer (Perkin-Elmer Lambda 9 UV/Vis). Fading rate was measured in a similar manner after first removing the UV radiation source.

As UV radiation strikes the samples, which were tested, the incorporated photochromic dye begins to convert from a colorless to a colored state. More color develops as the exposure to UV radiation continues until the color intensity reaches a substantially constant plateau. Since the absorbance also increases as the photochromic dye converts from a colorless to a colored state, this value is a convenient measure of the rate at which the material darkens. T½ refers to the time (in seconds) to reverse to 50% absorbance. The transition to darkness was noted to be practically completed in less than about 4 seconds. The lenses described above were evaluated and the absorbance values were determined (as T½) as follows: Absorbance at 424 nm was 16 seconds; at 610 nm—8 seconds and at 586 nm—8 seconds.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A photochromic optical lens comprising a substrate and a superstrate adheringly bonded to a surface of said substrate, said substrate containing thermoplastic aromatic polycarbonate resin, said superstrate containing at least one layer containing thermoplastic polyurethane resin and a photochromic dye selected from the group consisting of pyrans, oxazines, fulgides and fulgimides.

2. The photochromic optical lens of claim 1 wherein superstrate further contains a layer containing thermoplastic aromatic polycarbonate resin.

3. The photochromic optical lens of claim 1 wherein pyran is a member selected from the group consisting of naphtho-pyrans, spirobenzopyrans and spironaphthopyrans.

4. The photochromic optical lens of claim 1 wherein oxazine is a member selected from the group consisting of spirobenzoxazines and spironaphthoxazines.

5. A process for making a photochromic optical lens comprising
    (A) placing in a cavity of a mold a film containing at least one ply that comprises thermoplastic polyurethane resin and a photochromic dye, and
    (B) injecting a thermoplastic polycarbonate resin into said cavity.

6. The process of claim 5 wherein film further contains a ply containing thermoplastic aromatic polycarbonate resin.

7. The process of claim 6 wherein ply containing thermoplastic polycarbonate faces the cavity.

8. The process of claim 5 further comprising preforming and optionally trimming said film prior to placing said film into said mold cavity.

9. A process for making a photochromic optical lens comprising (i) injection into a molding cavity of thermoplastic polycarbonate to form a substrate and (ii) a subsequent injection into said cavity of a thermoplastic composition containing polyurethane and a photochromic dye to form a superstrate.

10. A process for making a photochromic optical lens that includes a substrate and a superstrate wherein superstrate is adheringly bonded to a surface of said substrate comprising:

(A) placing in a cavity of a mold said superstrate in the form of a film containing at least one ply that comprises thermoplastic polyurethane resin and at least one photochromic dye selected from the group consisting of pyrans, oxazines, fulgides and fulgimides, and at least one ply containing thermoplastic aromatic polycarbonate resin, wherein said ply containing thermoplastic aromatic polycarbonate faces said cavity; and (B) injecting a thermoplastic polycarbonate resin into said cavity to form said substrate.

11. The process of claim 10 further comprising preforming and optionally trimming said film prior to placing said film into said mold cavity.

* * * * *